United States Patent
Zimmer et al.

(10) Patent No.: US 7,460,129 B2
(45) Date of Patent: Dec. 2, 2008

(54) MANIPULATING TEXT AND GRAPHIC APPEARANCE

(75) Inventors: Mark Zimmer, Aptos, CA (US); Kok Chen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/745,157

(22) Filed: May 7, 2007

(65) Prior Publication Data

US 2007/0206028 A1   Sep. 6, 2007

Related U.S. Application Data

(63) Continuation of application No. 11/021,358, filed on Dec. 23, 2004, now Pat. No. 7,227,551.

(51) Int. Cl.
| | |
|---|---|
| G06T 17/00 | (2006.01) |
| G09G 5/00 | (2006.01) |
| G06K 9/40 | (2006.01) |
| G06K 9/36 | (2006.01) |
| G06K 9/20 | (2006.01) |
| G06K 9/68 | (2006.01) |
| G06T 11/00 | (2006.01) |

(52) U.S. Cl. .......... 345/586; 345/428; 345/606; 345/643; 382/283; 382/254; 382/218

(58) Field of Classification Search ........ 345/421, 345/428, 586, 588, 606, 611, 628, 643, 592, 345/467–468, 469.1, 418, 581, 618, 626, 345/629, 501, 563; 382/253–256, 282–283, 382/260–266, 300, 171–172, 176, 218, 228

See application file for complete search history.

(56) References Cited

U.S. PATENT DOCUMENTS

| | | | |
|---|---|---|---|
| 5,548,705 A * | 8/1996 | Moran et al. ......... | 715/863 |
| 6,028,608 A * | 2/2000 | Jenkins ............... | 345/619 |
| 7,088,845 B2 * | 8/2006 | Gu et al. ............. | 382/103 |
| 2004/0183800 A1 * | 9/2004 | Peterson ............. | 345/440 |

* cited by examiner

*Primary Examiner*—Wesner Sajous
(74) *Attorney, Agent, or Firm*—Wong, Cabello, Lutsch, Rutherford & Brucculeri, L.L.P.

(57) ABSTRACT

A method, device and computer system for creating a smooth, continuous height (scalar or vector) field are described. The described techniques permit arbitrary closed regions to be smoothly shaded without producing unnatural smoothness at the region's edges or boundaries.

24 Claims, 3 Drawing Sheets

MANIPULATING TEXT AND GRAPHIC APPEARANCE

CROSS-REFERENCE TO RELATED APPLICATIONS

This continuation application claims priority to U.S. patent application Ser. No. 11/021,358, entitled "MANIPULATING TEXT AND GRAPHIC APPEARANCE," filed Dec. 23, 2004 and which is hereby incorporated by reference.

BACKGROUND

The invention relates generally to computer graphics and more particularly to the generation of spatially varying effects applied to an arbitrary graphic region (e.g., highlighting, blurring, vertical rise, shading, lighting effects and the like).

Graphic artists often spend a significant amount of time generating spatially varying effects for a specified region such as a character, a string of characters or a graphic object or image. In one approach graphic artists apply a shading via an airbrush and then mask the resulting image so as to conform it to the prescribed region—repeating as needed to obtain the desired visual effect. While such techniques can be used to generate visually stunning effects, they typically require large amounts of time and/or a large degree of artistic ability. Thus, it would be beneficial to provide a mechanism to rapidly and, to a large degree automatically, generate spatially varying effects for arbitrarily defined regions.

SUMMARY

The invention provides a method and system to generate modified digital representations of arbitrary regions. The method includes receiving a mask, constraint values and initial condition values. The mask defines one or more inside regions, one or more outside regions and one or more boundaries. A mask could, for example, define a single character, a plurality of characters such as a word or an arbitrary image. The constraints specify values that are retained in the modified (and final) representation and correspond to the mask's outside and boundary regions. The initial conditions specify the initial or starting values of an image and correspond to the mask's inside and boundary regions.

The initial values and constraints are combined in a temporary buffer using the mask and blurred in accordance with a specified filter (e.g., a Gaussian filter) using an initial blur radius. Once combined, the blur radius is reduced and the constraints are enforced—those temporary buffer elements corresponding to the outside regions are set to their corresponding constraint value while those temporary buffer elements corresponding to the boundary regions are set to a value between their combined value and the corresponding constraint value (e.g., interpolated). The operations of blurring, reducing the blur radius and applying the constraints are repeated until the blur radius drops below a specified value (e.g., a value corresponding to a single pixel). Once complete, temporary buffer values corresponding to the inside and boundary regions represent the modified graphical image.

In other embodiments, other low pass filtering may be used instead of conventional blurring filters. In these embodiments, the initial blur radius corresponds to an initial cut-off frequency. During each iteration of the method, the cut-off frequency is increased by a specified amount until it reaches or exceeds some threshold frequency such as, for example, the frequency of the pixel grid.

Methods in accordance with the invention may be stored in any media that is readable and executable by a processor. Illustrative processors include a computer-system's central processing unit and/or graphical processing unit.

DETAILED DESCRIPTION

The present invention provides a method, system, and computer program product for generating digital images having spatially varying effects. The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 1:
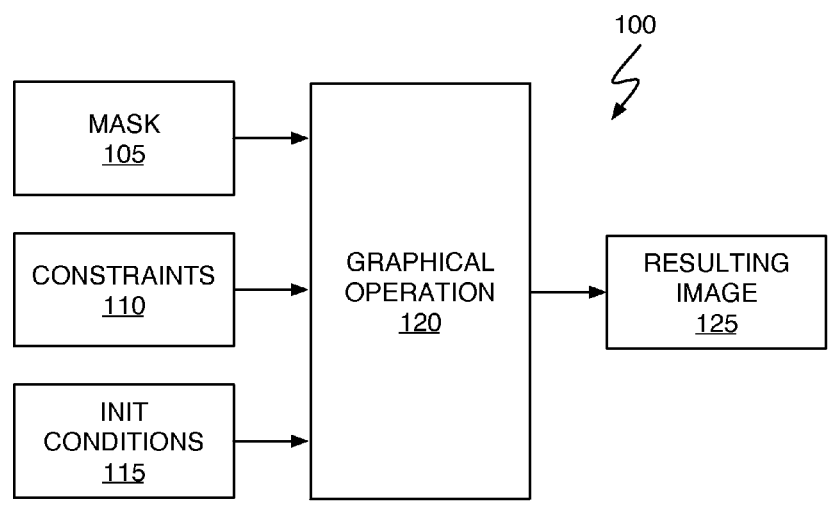
FIG. 1 shows, in block diagram form, the inputs to a graphical operation in accordance with one embodiment of the invention.

Referring to FIG. 1, technique 100 in accordance with one embodiment of the invention takes as input mask 105, boundary constraints 110 and initial conditions 115. With these inputs, a series of graphical operations 120 are performed (see discussion below) to generate resulting image 125. In general, graphic operation 120 blends constraint values 110 and initial conditions 115 using mask 105 to produce values (within the region defined by mask 105) that are continuous at the mask's boundaries and that match the specified constraint values at the mask's boundaries. Such an operation can generate stunning visual effects with little user input and/or refinement and in a computationally efficient manner.

Figure 2A:
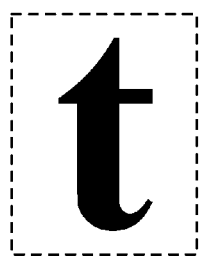
FIG. 2 shows illustrative masks.
Figure 2B:
Figure 2C:
Figure 2D:
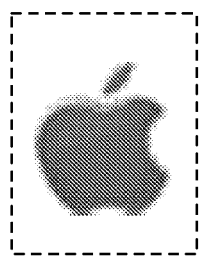
Figure 2E:
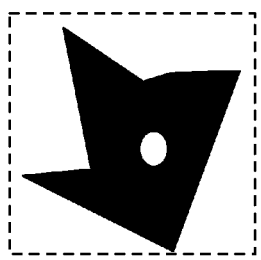
Figure 2F:
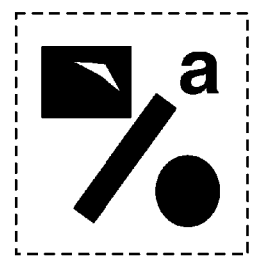

As used herein, mask 105 comprises an arbitrary two-dimensional (2D) scalar field whose values define one or more "inside" regions, one or more "outside" regions and "boundaries" between the inside and outside regions. For example, mask 105 could use a value representing '1' to identify inside regions (e.g., the binary value 11111111), a value representing '0' to identify outside regions (e.g., the binary value 00000000) and values representing values between 1 and 0 to identify boundaries. Accordingly, mask 105 may define an area that has zero or more hard edges, zero or more soft edges or a combination of hard and soft edges. Mask 105 may also be an anti-aliased scan conversion of a geometric outline(s). Illustrative masks include, but are not limited to, a single character (e.g., FIG. 2A), a plurality of characters such as a word (e.g., FIG. 2B), well-known geometric shapes (e.g., FIGS. 2C and 2D) and arbitrary geometric shapes (FIGS. 2E and 2F).

As used herein, constraints 110 comprise arbitrary 2D scalar or vector field values that correspond to those areas defined by mask 105 that are not completely within the mask's "inside" region. Thus, constraints 110 comprise values corresponding to mask 105's outside regions and boundaries. Illustrative scalar values include values representing height and potential. Illustrative vector values include values representing color and velocity (i.e., directional motion).

As used herein, initial conditions 115 comprise arbitrary 2D scalar or vector field values that correspond to those areas defined by mask 105 that are not completely within the mask's "outside" region. Thus, initial conditions 115 comprise values corresponding to mask 105's inside regions and boundaries. It will be recognized that in any given implementation, constraint values 110 and initial conditions 115 are of the same data type—each must be either a scalar field or a vector field.

Figure 3:
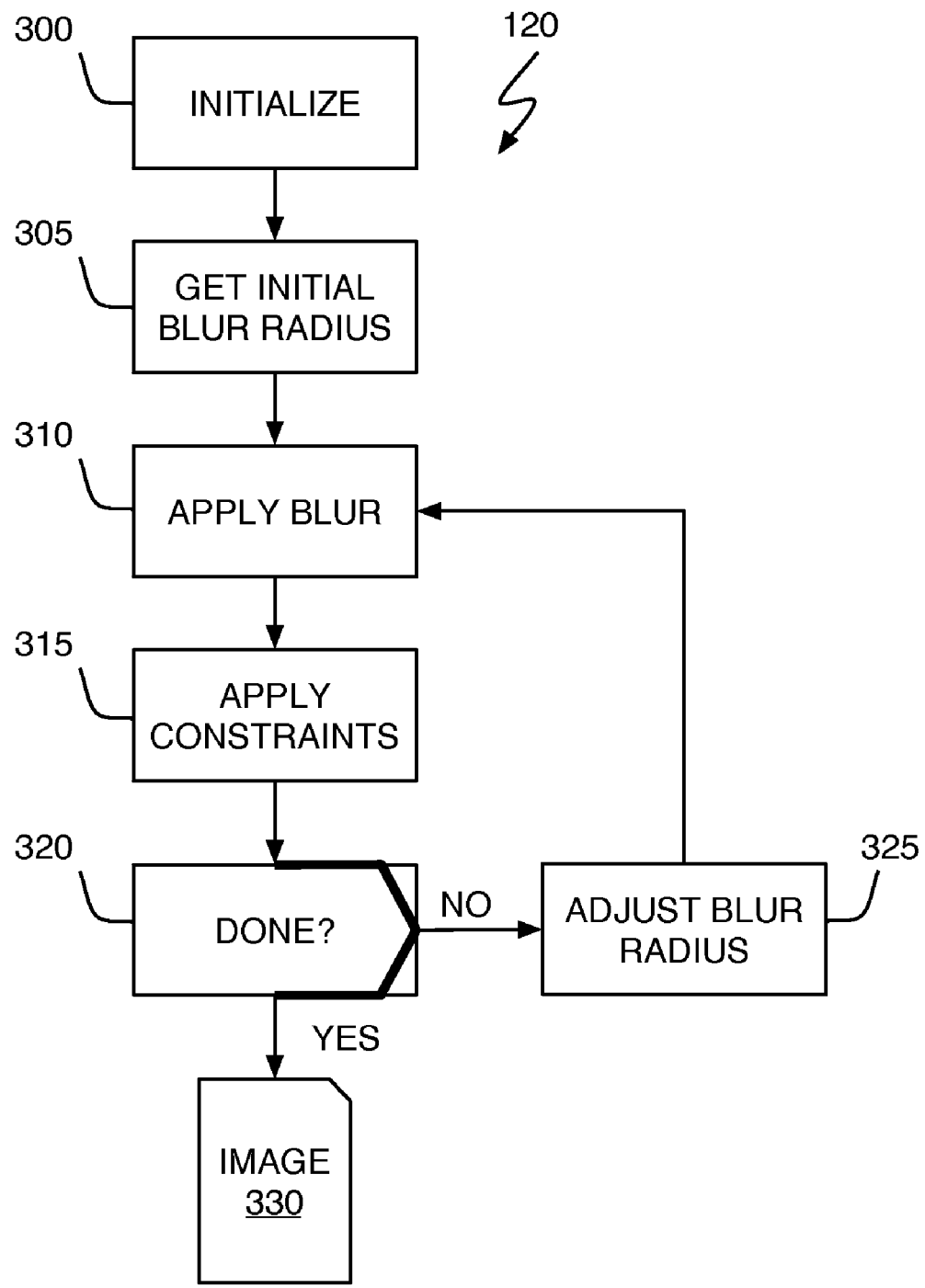
FIG. 3 shows, in flowchart form, a graphical operation in accordance with one embodiment of the invention.
Figure 4:
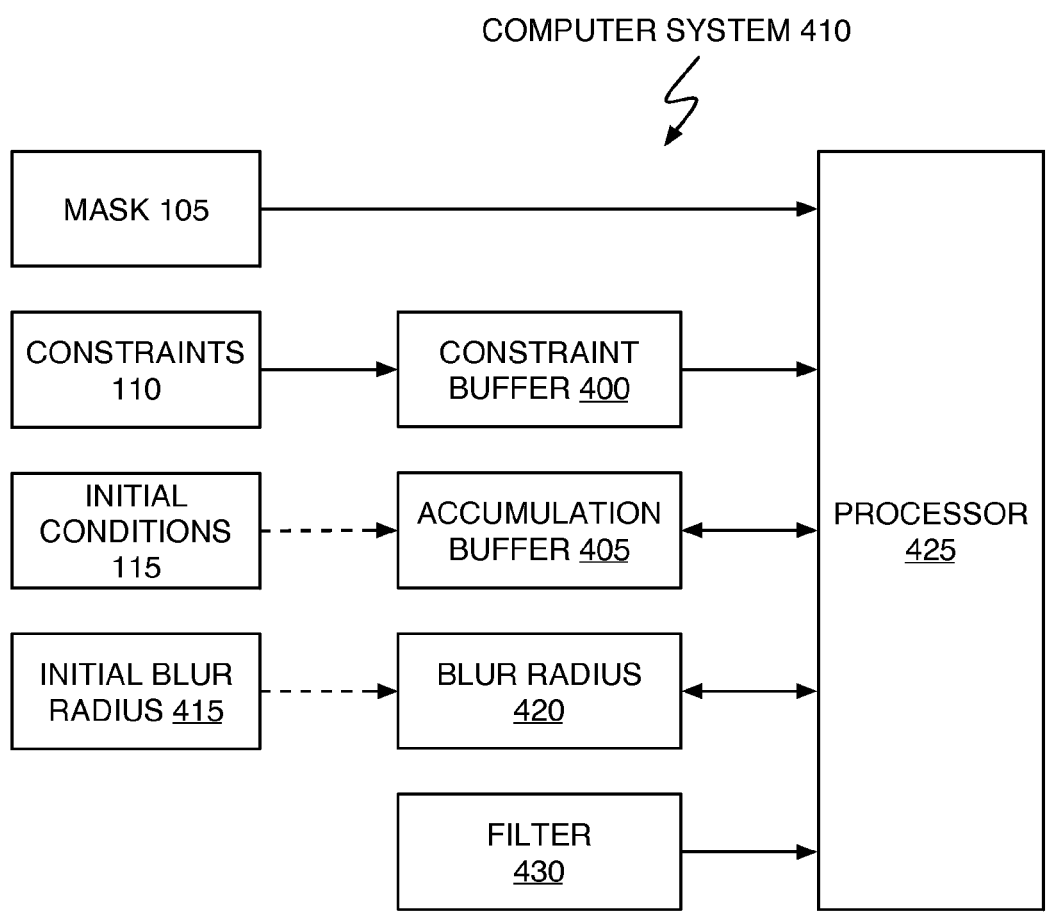
FIG. 4 shows, in block diagram form, a system for performing the acts of FIG. 3.

Referring to FIG. 3, graphic operation 120 in accordance with one embodiment of the invention begins by initializing data structures used to represent mask 105, constraints 110 and initial conditions 115 (block 300). Referring to FIG. 4, for example, constraints 110 (i.e., constraint values) are loaded into constraint buffer 400 and initial conditions 115 (i.e., initial condition values) are loaded into accumulation buffer 405 of computer system 410. Next, an initial blur radius value is determined (block 305). It has been found that an initial blur radius value equal to the maximum width of any contiguous "inside" region defined by mask 105 generally provides visually pleasing results. For example, if mask 105 defines a circular region, the initial blur radius value would be set to the circle's diameter. If mask 105 defines a square region, the initial blur radius value would be set to the square's edge length. If mask 105 defines a text region, the initial blur radius value would be set to the width of the thickest body stem. In another embodiment, the initial blur radius is set to a value greater than the maximum width of any contiguous mask area by a specified factor (e.g., by a factor of 1.25), but less than the maximum width of mask 105. In yet another embodiment, the initial blur radius is set to a value less than the maximum width of any contiguous mask area by a specified factor (e.g., by a factor of 0.8). As shown in FIG. 4, initial blur radius value 415 is assigned to method variable blur radius 420. (In FIG. 4, the dashed lines represent the one-time use of information.)

Referring again to FIGS. 3 and 4, following the acts of blocks 305, processor 425 filters the contents of accumulation buffer 405 using a specified filter 430 and the (initial) blur radius value, returning the result to accumulation buffer 405 (block 310). Next, processor 425 uses mask 105 and constraint values 110 stored in constraint buffer 400 to force all values in accumulation buffer 405 not corresponding to mask 105's inside region to a specified value (block 315). That is, all those values in accumulation buffer 405 corresponding to mask 105's outside region are set to their corresponding constraint buffer value and all those values in accumulation buffer 405 corresponding to mask 105's boundary region are set to a value between their current value and their corresponding constraint buffer value. In one embodiment, interpolation (e.g., linear interpolation) is used to determine accumulation buffer values corresponding to mask 105's boundary region. If the current blur radius value 420 is not less than a specified value such as, for example, one pixel (the "No" prong of block 320), current blur radius 420 is adjusted (block 325) and the acts in accordance with blocks 310-320 are repeated. It will be noted that the specified value (or other criteria against which the current blur radius is compared during the acts of block 320) may be a value set prior to beginning graphical operations 120 or it may be determined programmatically during execution of graphical operations 120. If the current blur radius value is less than or equal to a specified value (the "Yes" prong of block 320), processor 425 extracts from accumulation buffer 405 those values corresponding to mask 105 (inside and boundary regions) to generate final image 330.

Illustrative filters include, but are not limited to, Gaussian, box, Sinc and Lanczos filters. In one embodiment, blur radius value 420 is monotonically decreased each time the acts of block 325 are performed. For example, the blur radius may be reduced by a factor of 0.7, 0.5 or 0.3. It is noted that in the special case when blur radius value 420 is reduced by one-half (i.e., a factor of 0.5) in accordance with block 325, graphic operation 120 repeats the acts of blocks 310-325 approximately $\log_2$(initial blur radius÷final blur radius) times.

By way of example, technique 120 in accordance with FIG. 3 can use an arbitrary anti-aliased region such as text (defined by mask 105) to compute a height field that is continuous, continuously differentiable and zero-valued at the region's boundary. Such a height field may be used for automatically shading two-dimensional outlines very rapidly and without large amounts of hand-editing. Further, the resulting visual effect can be quite striking.

In another embodiment, technique 120 may be described in terms of electrical-type filtering operations. In these embodiments filter 430 would be another low pass filter, initial blur radius 415 would be the low pass filter's initial cut-off frequency and acts in accordance with block 325 would monotonically increase the filter's cut-off frequency. The operation could be halted (block 320) when the low pass filter's cut-off frequency met or exceeded the frequency of the pixel grid.

Various changes in the components, circuit elements, as well as in the details of the illustrated operational methods are possible without departing from the scope of the following claims. For instance, the illustrative system of FIG. 4, processor 410 may be a computer system's central processing unit, a graphics processing unit, a digital signal processor, a vector processing unit or a combination of these types of processors. Similarly, constraint and accumulation buffers may be implemented using general purpose memory (e.g., system random access memory), special purpose memory (e.g., memory allocated for graphic operations and/or graphical processors) or dedicated hardware registers. One of ordinary skill in the art will also recognize that the acts of block 310 may be performed using a family of filters rather than a single as described above. For example, a family of filters that have large exponential profiles at large blur radii and steeper profiles at smaller blur radii may also be used. In addition, acts in accordance with FIG. 3 may be performed by a programmable control device executing instructions organized into one or more program modules. A programmable control device may be a single computer processor, a special purpose processor (e.g., a digital signal processor, a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A method of applying an effect to a collection of graphic elements, comprising the steps of:

a. defining a collection of graphic elements and a specified result criteria;

b. defining a set of forced values for a first subset of said collection of graphics elements;
c. applying said set of forced values to said first subset of graphics elements;
d. applying a filter to a second subset of graphic elements, said second subset of graphic elements characterized by inclusion in said collection of graphic elements but not in said first subset;
e. testing one or more filtered graphics elements from said second subset to determine if said specified result criteria has been met;
f. if said specified result criteria has been met, displaying graphic elements derived from said filtered graphics elements of said second subset; and
g. if said specified result criteria has not been met, repeating the process steps d through f.

2. The method of claim 1 wherein a border define at least a partial boundary between said first subset of graphic elements and said second subset of graphic elements.

3. The method of claim 2 wherein said border comprises a plurality of graphic elements.

4. The method of claim 2 comprising the additional steps of:
identifying a third subset of graphic elements, all graphic elements in said third subset having a common relationship with respect to said border,
determining a state for each of said graphic elements in said third subset by interpolating between one or more graphic elements in said first subset and one or more graphic elements in said second set.

5. The method of claim 4 wherein the graphic elements used for interpolation are not part of the third subset of graphics elements.

6. The method of claim 4 wherein said state is a scalar value.

7. The method of claim 3 further comprising the steps of, for each graphic element said border comprises, determining a state by interpolating between one or more graphic elements in said first subset and one or more graphic elements in said second set.

8. The method of claim 7 wherein said state is a scalar value.

9. The method of claim 1 wherein said forced values are applied after step d but before iteration of the process.

10. The method of claim 4 wherein said forced values are applied after step d but before iteration of the process.

11. The method of claim 7 wherein said forced values are applied after step d but before iteration of the process.

12. A method of applying an effect to a finite collection of graphic elements, comprising the steps of:
a. defining a result criteria;
b. defining a collection of graphic elements, each of said collection of graphics elements capable of description through identifying an inside region, an outside region, and a boundary at least partially between said inside region and said outside region;
c. applying a set of forced values to said collection of graphics elements describable as said outside region;
d. applying a filter to said collection of graphic elements describable as said inside region;
e. testing one or more filtered graphics elements, from said collection of graphics elements, to determine if said result criteria has been met;
f. if said result criteria has been met, displaying graphic elements derived from said filtered graphics elements; and
g. if said result criteria has not been met, repeating the process If said specified result criteria has not been met, repeating the process steps d through f.

13. The method of claim 12 wherein said forced values are applied after step d but before iteration of the process.

14. The method of claim 12 wherein said boundary comprises a plurality of graphic elements.

15. The method of claim 12 comprising the additional steps of:
identifying a third subset of graphic elements, all graphic elements in said third subset having a common relationship with respect said boundary,
determining a state for each of said graphic elements in said third subset by interpolating between one or more graphic elements describable as said inside region and one or more graphic elements describable as said outside region.

16. The method of claim 15 wherein the graphic elements used for interpolation are not part of the third subset of graphics elements.

17. The method of claim 14 further comprising the steps of, for each graphic element said boundary comprises, determining a state by interpolating between one or more graphic elements describable as said inside region and one or more graphic elements describable as said outside region.

18. The method of claim 12 wherein said forced values are applied after step d but before iteration of the process.

19. The method of claim 17 wherein said forced values are applied after step d but before iteration of the process.

20. A computer readable media encoded to cause a computer to perform one of the methods of claim 1 or claim 12.

21. A method of applying a result effect to graphic elements comprising the steps of:
a. identifying criteria for indicating whether an effected region of graphics elements sufficiently comprises said result effect;
b. identifying a value for application to a control region of graphic elements that is at least partially adjacent to said effected region;
c. applying an operation on a first set of graphic elements, said operation resulting in changes to a group of graphic elements, said group of graphic elements comprising said effected region and said control region;
d. applying said value to graphic elements in said control region;
e. testing one or more graphic elements in said effected region to determine if said criteria has been met; and
f. if said criteria has not been met, repeating said steps c through f.

22. The method of claim 21 comprising the additional step of, if said criteria has been met, displaying graphics derived from said effected region and control region.

23. The method of claim 21 wherein said first set of graphics elements is said effected region.

24. The method of claim 21 comprising the additional steps of:
identifying a second set of graphic elements, said second set of graphics elements having a common relationship to a border between said effected region and said control region; and
applying a value to graphic elements in said second set of graphic elements by interpolating between one more graphic elements in said effected region and one or more graphic elements in said control region.

* * * * *